(12) United States Patent
Bonte et al.

(10) Patent No.: US 11,793,116 B2
(45) Date of Patent: Oct. 24, 2023

(54) AGRICULTURAL BALER WITH FRAMELESS AND WELDLESS PLUNGER

(71) Applicant: CNH Industrial America LLC, New Holland, PA (US)

(72) Inventors: Xavier G. J. M. Bonte, PB Zuidzande (NL); Frederik Demon, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 103 days.

(21) Appl. No.: 17/245,602

(22) Filed: Apr. 30, 2021

(65) Prior Publication Data

US 2021/0321570 A1    Oct. 21, 2021

Related U.S. Application Data

(63) Continuation of application No. PCT/EP2019/079829, filed on Oct. 31, 2019.

(30) Foreign Application Priority Data

Nov. 2, 2018   (EP) .................................. 18204216

(51) Int. Cl.
    *A01F 15/04*    (2006.01)
    *B30B 15/06*    (2006.01)
    *B30B 9/30*    (2006.01)

(52) U.S. Cl.
    CPC .......... *A01F 15/042* (2013.01); *B30B 9/3021* (2013.01); *B30B 15/065* (2013.01)

(58) Field of Classification Search
    CPC .... A01F 15/046; A01F 15/042; A01F 15/101; A01F 15/04; A01F 15/0825; B30B 9/3021; B30B 15/041; B30B 15/065
    See application file for complete search history.

(56) References Cited

U.S. PATENT DOCUMENTS

| 2005/0056165 A1 | 3/2005 | Roth |
| 2010/0242749 A1 | 9/2010 | Demulder et al. |

(Continued)

FOREIGN PATENT DOCUMENTS

DE           206026           11/1919

OTHER PUBLICATIONS

Notification of Transmittal of the International Search Report and the Written Opinion of the International Searching Authority, or the Declaration dated Jan. 16, 2020 for International Application No. PCT/EP2019/079829 (11 pages).

(Continued)

*Primary Examiner* — Jimmy T Nguyen
(74) *Attorney, Agent, or Firm* — Peter K. Zacharias

(57) ABSTRACT

A plunger for an agricultural baler includes: a plurality of plunger sections held together to form the plunger, the plurality of plunger sections including a pair of plunger end sections, each of the plunger sections including at least one tube holding portion having a tube opening formed therein; at least one of at least one roller or at least one sliding block attached to and extending laterally from each of the plunger end sections; and a tube placed within the tube opening of each tube holding portion such that an interference fit is formed between the tube and the at least one tube holding portion of each plunger section to hold the plunger sections together.

19 Claims, 16 Drawing Sheets

(56) References Cited

U.S. PATENT DOCUMENTS

2013/0228504 A1* 9/2013 McElroy ................ B01D 29/21
 210/232
2015/0059310 A1   3/2015 Biebuyck
2015/0208584 A1*  7/2015 Boone ................... B30B 9/3021
 56/341
2015/0342120 A1* 12/2015 O'Reilly ............... A01F 15/042
 100/268
2016/0000011 A1   1/2016 Biebuyck et al.
2018/0098507 A1*  4/2018 Kraus .................... A01F 15/04

OTHER PUBLICATIONS

Extended European Search Report dated Apr. 12, 2019 for European Patent Application No. 18204216.8 (6 pages).

* cited by examiner

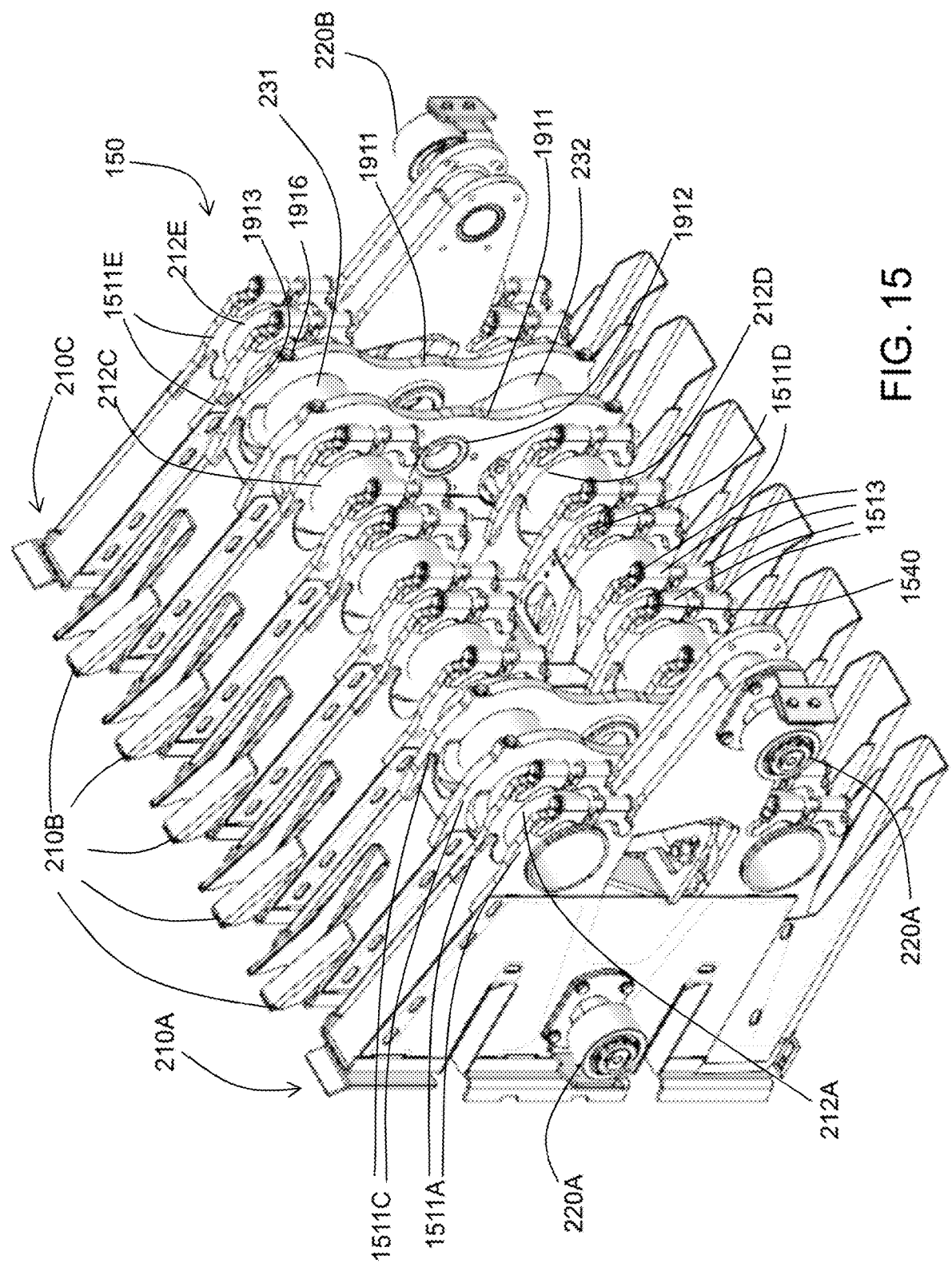

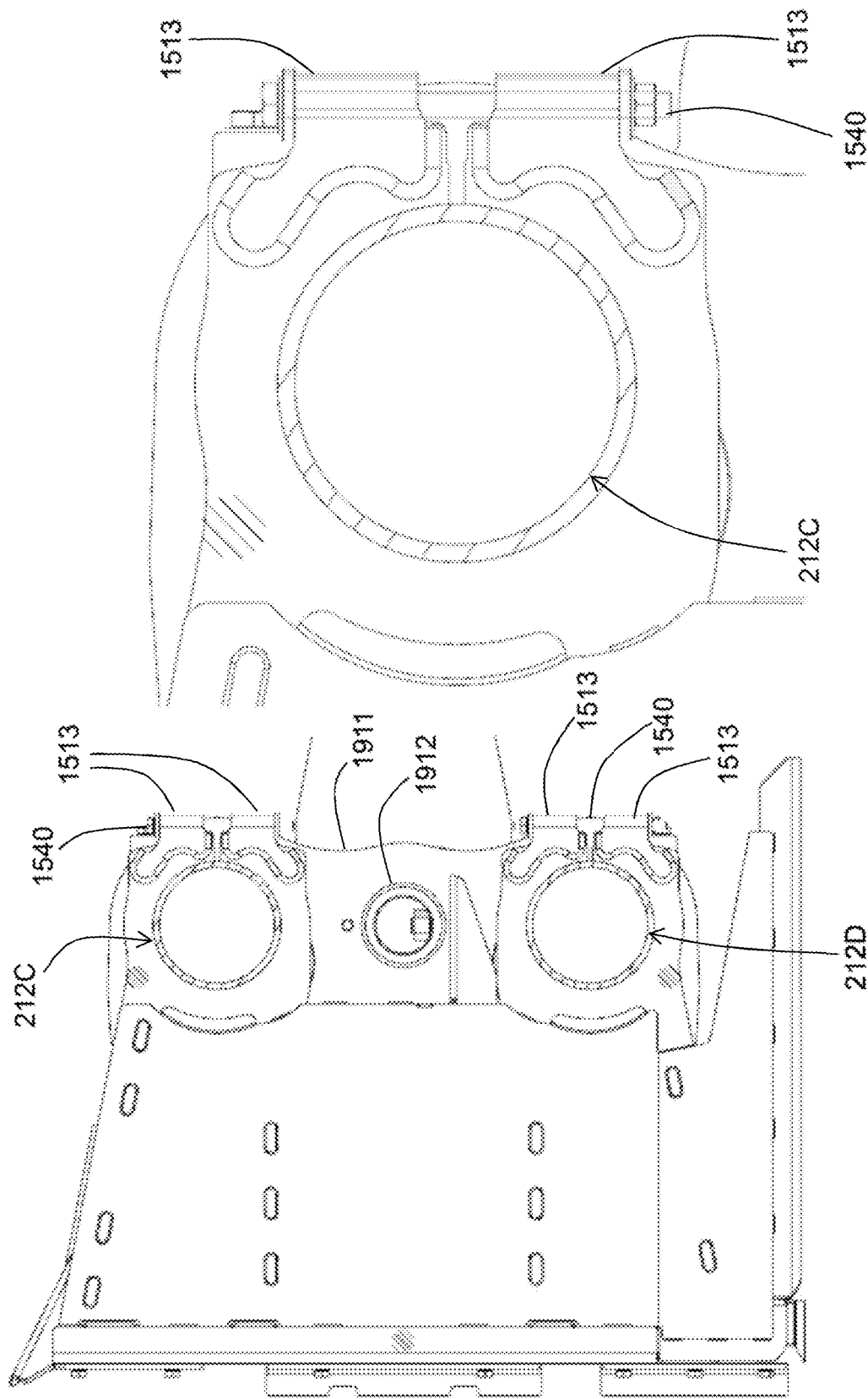

AGRICULTURAL BALER WITH FRAMELESS AND WELDLESS PLUNGER

CROSS REFERENCE TO RELATED APPLICATION

This application is a continuation of International Application No. PCT/EP2019/079829 filed Oct. 31, 2019, which claims priority to European Patent Application No. EP 18204216.8 filed Nov. 2, 2018, the contents of which are incorporated herein by reference.

BACKGROUND OF THE INVENTION

The present invention relates to agricultural balers, and, more particularly, to plungers of agricultural balers.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber, which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit, which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers, which extend laterally outward from the sides of the plunger. The rollers on each side of the plunger are received within a respective plunger slot formed in the sidewalls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

Many plungers are formed by plunger sections that are welded to a frame, which holds the plunger sections together to form the plunger. Due to the constant reciprocating action of the plunger, many plunger designs are prone to durability issues.

What is needed in the art is an agricultural baler with a plunger that has increased durability compared to known plungers.

SUMMARY OF THE INVENTION

The present invention provides an agricultural baler with a plunger that includes a plurality of plunger sections each having a tube holding portion that forms an interference fit with a tube to hold the plunger sections together and form the plunger.

The invention in one form is directed to a plunger for an agricultural baler includes: a plurality of plunger sections held together to form the plunger, the plurality of plunger sections including a pair of plunger end sections, each of the plunger sections including at least one tube holding portion having a tube opening formed therein; at least one of at least one roller or at least one sliding block attached to and extending laterally from each of the plunger end sections; and a tube placed within the tube opening of each tube holding portion such that an interference fit is formed between the tube and the at least one tube holding portion of each plunger section to hold the plunger sections together.

In some forms of the invention, the tube opening is an adjustable size tube opening.

In some forms of the invention, at least one of the tube holding portions includes at least one pair of spaced apart clamp openings, the plunger further including at least one clamp urging the at least one pair of spaced apart clamp openings toward one another to clamp the at least one tube holding portion onto the tube.

In some forms of the invention, the at least one clamp includes a plurality of clamps, each of the plurality of clamps urging the at least one pair of spaced apart clamp openings of a respective tube holding portion toward one another.

In some forms of the invention, a single clamp urges the at least one pair of spaced apart clamp openings of multiple tube holding portions toward one another.

In some forms of the invention, the at least one clamp includes a pair of spaced apart clamp bars urged toward one another by a connector, a portion of each clamp bar being held in a respective one of the clamp openings.

In some forms of the invention, the clamp bars each include at least one bearing portion held in a respective clamp opening, each of the bearing portions including a rounded notch.

In some forms of the invention, the at least one pair of spaced apart clamp openings are coaxial.

In some forms of the invention, the at least one clamp extends through the at least one pair of spaced apart clamp openings.

In some forms of the invention, at least one of the tube holding portions comprises an arcuate member that is movable to adjust the size of the tube opening to thereby respectively clamp or release the at least one tube holding portion onto or from the tube.

In some forms of the invention, the arcuate member is fixed at a pivot point thereof, the arcuate member being movable by pivoting about the pivot point to adjust the size of the tube opening.

In some forms of the invention, a radius of the arcuate member is substantially the same as a radius of the tube.

In some forms of the invention, the arcuate member is movable by a connector connected to the arcuate member, the connector extending through, and protruding from, the tube holding portion.

In some forms of the invention, each of the tube openings defines a tube opening diameter and the tube includes a plurality of increased diameter portions that are each placed in and compressed by a respective tube opening, each increased diameter portion defining an increased diameter that is greater than the tube opening diameter of the respective tube opening in which the increased diameter portion is placed when the increased diameter portion is uncompressed.

In some forms of the invention, the plunger further includes a bushing bearing on the tube and the tube opening.

In some forms of the invention, each plunger section includes at least one pair of spaced apart tube holding portions, the tube openings of each respective pair of tube holding portions being coaxially aligned with one another.

In some forms of the invention, each plunger section includes a first tube holding portion including the tube opening and a second tube holding portion including a second tube opening. The plunger further includes a second tube placed within the second tube opening of each second tube holding portion such that an interference fit is formed between the second tube and the second tube holding portion of each plunger section.

In some forms of the invention, at least one of the plunger sections includes a driver connection portion connected to the tube holding portion, the driver connection portion including a rod opening sized to hold a connecting rod therein.

In some forms of the invention, the plunger includes a roller connecting portion connected to the tube holding portion of each of the plunger end sections and to the at least one roller.

In some forms of the invention, an axial direction of the tube is perpendicular to a direction of movement of the plunger relative to the agricultural baler facilitated by the at least one roller and/or the at least one sliding block.

In some forms of the invention, an agricultural baler is provided. The agricultural baler includes a main bale chamber and any of the aforementioned plungers disposed within the main bale chamber. The main bale chamber includes a pair of spaced apart plunger rails, each of the plunger rails being in contact with a roller attached to a respective one of the plunger end sections.

In some forms of the invention, a connecting rod couples to the plunger for reciprocatingly driving the plunger.

An advantage of the present invention is that the plunger may be formed without a frame structure to which the plunger sections are welded. The absence of welds holding the plunger sections to the frame structure can increase the durability of the plunger by eliminating material weak spots that are produced during welding.

Another advantage is that the formed interference fit between the plunger sections and the tube(s) may provide more surface area and therefore be stronger than comparable welds because the size of the welds may be reduced by space constraints adjacent to the frame and plunger sections.

Another advantage is that the plunger sections and tube(s) may be easily separable from another for repair and/or replacement, if necessary.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 15 is a perspective view of another exemplary embodiment of a plunger formed according to the present invention;

FIG. 17 is a cross-sectional view of tube holding portions and clamps illustrated in FIG. 16;

FIG. 18 is a close-up cross-sectional view of one of the tube holding portions and clamps illustrated in FIG. 17;

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
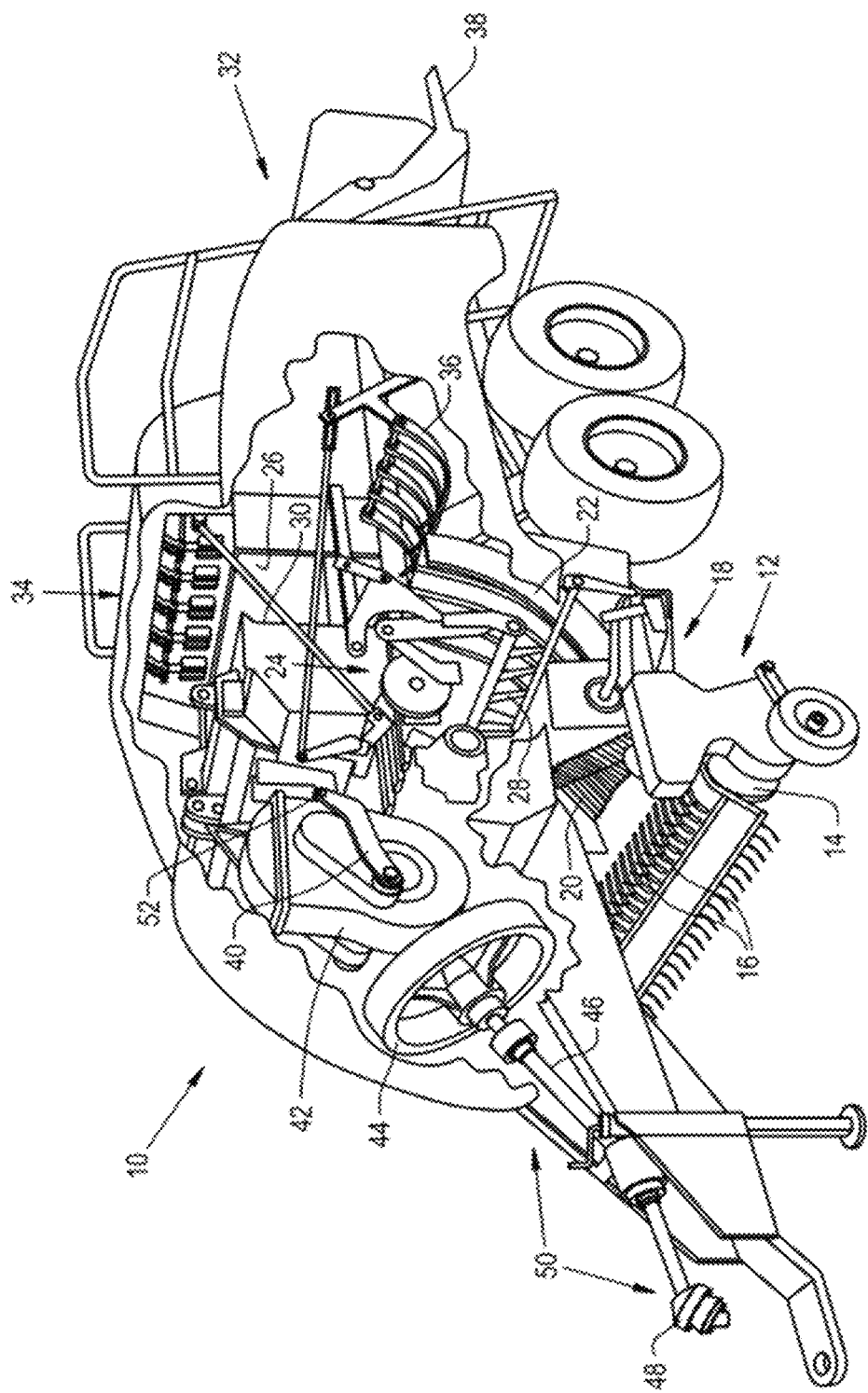
FIG. 1 is a perspective cutaway view showing the internal workings of a large square baler, which includes a main bale chamber housing a plunger formed according to the present invention.

Referring now to the drawings, and more particularly to FIG. 1, there is shown a perspective cutaway view showing the internal workings of a large square baler 10. The baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. The pre-compression chamber 22 and the packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. The stuffer forks 28 return to their original stationary state after the wad of material has been moved into the main bale chamber 26. The plunger 30 compresses the wads of crop into flakes to form a bale and, at the same time, gradually advances the bale toward an outlet 32 of the main bale chamber 26. The main bale chamber 26 and the plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

The plunger 30 is connected via a crank arm 40 with a gear box 42. The plunger 30 may be connected to the crank arm 40 by one or more connecting rods 52, which are also commonly referred to as "conrods," as will be described further herein. The gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). The PTO coupler 48, the drive shaft 46 and the flywheel 44 together define a portion of a driveline 50, which provides rotative power to the gearbox 42. The flywheel 44 has a sufficient mass to carry the plunger 30 through a compression stroke as power is applied to the drive shaft 46 by the traction unit (not shown).

Now, additionally referring to FIGS. 2-6, an exemplary embodiment of the plunger 30 shown in FIG. 1 is illustrated. The plunger 30 generally includes a plurality of plunger sections 210A, 210B, 210C held together to form the plunger 30, with the plunger 30 including a pair of plunger end sections 210A, 210C. In the illustrated embodiment, a plurality of intermediate plunger sections 210B are placed between the plunger end sections 210A and 210C, but it should be appreciated that the intermediate plunger sections 210B may not be necessary to form the plunger 30. One or more rollers 220A, 220B, illustrated as two rollers, are attached to each plunger end section 210A, 210C to help guide the reciprocating movement of the plunger 30 in the main bale chamber 26. The rollers 220A, 220B may be in contact with, for example, a pair of spaced apart plunger rails 221A, 221B (illustrated in dotted lines) of the main bale chamber 26, as is known. The roller(s) 220A may be in contact with a first plunger rail 221A and the roller(s) 220B may be in contact with a second plunger rail 221B opposite the first plunger rail 221A. As the plunger 30 reciprocates within the main bale chamber 26, the rollers 220A, 220B stay in contact with their respective plunger rail 221A, 221B to keep the plunger 30 properly positioned to compress wads of crop into flakes and form the bale. In some embodiments, sliding blocks may be utilized in place of, or in addition to, the rollers 220A, 220B to achieve a similar effect. The general shape of the plunger 30, and each of the plunger sections 210A, 210B, 210C forming the plunger 30, may be adjusted as desired, with many suitable shapes being known. Therefore, it should be appreciated that the plunger 30 formed according to the present invention may have any suitable shape for reciprocating movement to form bales in the main bale chamber 26.

To hold the plunger sections 210A, 210B, 210C together and form the plunger 30, each of the plunger sections 210A, 210B, 210C includes at least one tube holding portion 211A, 211B, 211C, 211D, 211E, 211F having a tube opening 212A, 212B, 212C, 212D, 212E, 212F formed therein and one or more tubes, illustrated as a first tube 231 and a second tube 232, placed within the tube opening 212A, 212B, 212C, 212D, 212E, 212F of each tube holding portion 211A, 211B, 211C, 211D, 211E, 211F. While the tubes 231, 232 are illustrated as being hollow, in some embodiments the tubes are solid. Further, the tubes 231, 232 may be adjusted to provide tubes with suitable strength for holding the plunger sections 210A, 210B, 210C together by, for example, increasing a tube diameter of the tubes 231, 232. In the exemplary embodiment illustrated, each of the plunger sections 210A, 210B, 210C has two pairs of tube holding portions: the end plunger section 210A has a pair of top tube holding portions 211A and a pair of bottom tube holding portions 211B; the intermediate plunger sections 210B have a pair of top tube holding portions 211C and a pair of bottom tube holding portions 211D; and the other end plunger section 210C has a pair of top tube holding portions 211E and a pair of bottom tube holding portions 211F. In this respect, the top tube holding portions 211A, 211C, and 211E may be referred to as "first tube holding portions" for holding the tube 231 in first tube openings 212A, 212C, 212E and the bottom tube holding portions 211B, 211D, 211F may be referred to as "second tube holding portions" for holding the second tube 232 in second tube openings 212B, 212D, 212F. In some embodiments, spacers are provided between adjacent tube holding portions 211A, 211B, 211C, 211D, 211E, 211F to prevent the plunger sections 210A, 210B, 210C from sliding closer together along the tubes 231, 232. It should be appreciated that while the plunger sections 210A, 210B, 210C, and their respective tube holding portions 211A, 211B, 211C, 211D, 211E, 211F, are illustrated as each having four total tube holding portions, in some embodiments each of the plunger sections 210A, 210B, 210C has only one tube holding portion. Alternatively, each of the plunger sections 210A, 210B, 210C may have more than one tube holding portions, such as two, three, four, or more tube holding portions.

The tubes 231 and 232 are placed in the tube openings 212A, 212B, 212C, 212D, 212E, 212F of each tube holding portion 211A, 211B, 211C, 211D, 211E, 211F such that an interference fit is formed between the tubes 231, 232 and the tube holding portions 211A, 211B, 211C, 211D, 211E, 211F of each plunger section 210A, 210B, 210C. The interference fit between the tubs 231, 232 and the tube holding portions 211A, 211B, 211C, 211D, 211E, 211F hold the plunger sections 210A, 210B, 210C together to form the plunger 30 without requiring, for example, a separate plunger frame to which the plunger sections 210A, 210B, 210C are welded. To form the interference fit between the tube holding portions 211A, 211B, 211C, 211D, 211E, 211F and the tubes 231, 232, each of the tube openings 212A, 212B, 212C, 212D, 212E, 212F may be an adjustable size opening that is closed by a respective clamp 240, 241.

Figure 3:
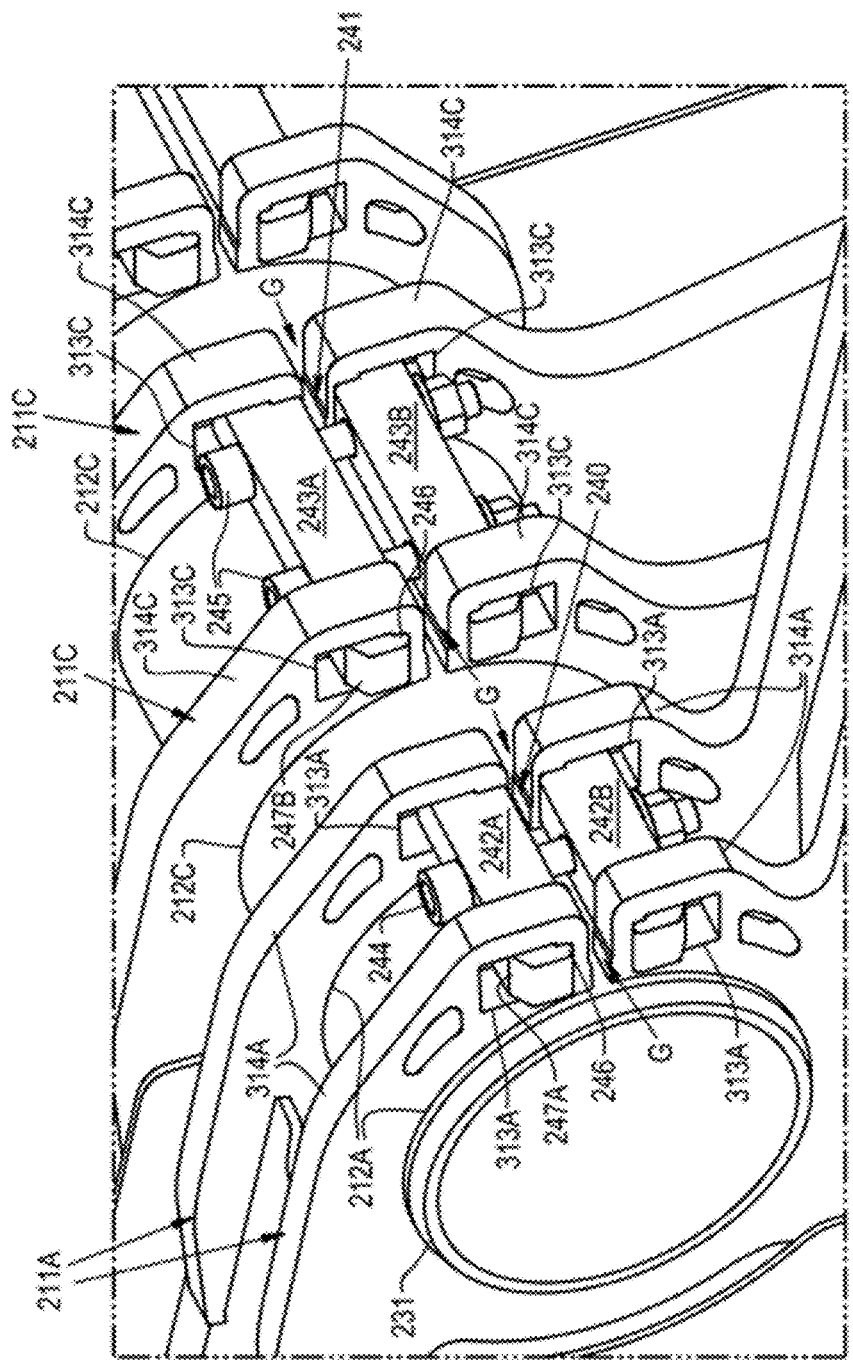
FIG. 3 is a close-up perspective view of an exemplary embodiment of tube holding portions of plunger sections illustrated in FIG. 2.

Referring specifically now to FIG. 3, some of the clamps 240, 241 closing tube openings, such as the tube openings 212A and 212C of the tube holding portions 211A and 211C, are illustrated in more detail. The tube openings 212A of each tube holding portion 211A may be coaxially aligned with one another and the tube openings 212C of each tube holding portion 211C may be coaxially aligned with one another, as well as with the tube openings 212A. The plunger sections 210A, 210B with the tube holding portions 211A, 211C are shown in further detail in FIGS. 4-5, respectively. The tube holding portions 211A and 211C may each have at least one pair of spaced apart clamp openings, illustrated as two pairs of clamp openings 313A and 313C, formed in respective opening arms 314A, 314C of the tube holding portions 211A, 211C that define a gap G therebetween. The opening arms 314A, 314C are movable toward one another to open or close the gap G and adjust the size of the tube openings 212A and 212C, respectively.

The clamps 240, 241 may each include a pair of respective clamp bars, with the clamp 240 including clamp bars 242A and 242B and the clamp 241 including clamp bars 243A and 243B, that are held together by one or more connectors 244, 245. Portions of the clamp bars 242A, 242B, 243A, 243B, such as bearing portions 247A, 247B, are placed in respective clamp openings 313A, 313C. The connectors 244, 245, illustrated as bolts, are tightened to urge the respective clamp bars 242A, 242B, 243A, 243B and the clamp openings 313A, 313C toward one another to close the gap G between the opening arms 314A, 314C and clamp the tube holding portions 211A, 211C onto the tube 231. Clamping the tube holding portions 211A, 211C onto the tube 231 forms the interference fit that holds the respective plunger sections together via connection to the tube 231. As can be appreciated from FIG. 3, a lateral distance between the opening arms 314A of the two adjacent tube holding portions 211A is less than a lateral distance between the opening arms 314C of the two adjacent tube holding portion 211C, with a length of the clamp bars 243A, 243B being relatively greater than a length of the clamp bars 242A, 242B and two bolts 245 holding the clamp bars 243A, 243B together to account for this difference. In some embodiments, each of the clamp bars 242A, 242B, 243A, 243B are provided with a lip 246 that connects to the bearing portions 247A, 247B and extends toward the gap G to secure the clamp bars 242A, 242B, 243A, 243B within their respective clamp openings 313A, 313C. While only the clamps 240 and 241 used to form the interference fit between the tube 231 and the tube holding portions 211A and 211C are illustrated in FIG. 3, it should be appreciated that the interference fit between the tubes 231 and 232 and the other tube holding portions 211B, 211D, 211E, and 211F can be formed in a similar fashion to hold the other plunger sections 210A, 210B, 210C together and form the plunger 30.

It should be appreciated that while clamps 240 are illustrated as being used to adjust the size of the tube openings 212A, 212B, 212C, 212D, 212E, 212F, in some embodiments the tube openings are partially open and naturally biased toward being closed by, for example, spring force in material of the tube holding portions 211A, 211B, 211C, 211D, 211E, 211F. In such embodiments, the natural closing bias may be temporarily counteracted to allow insertion of the tubes in the tube openings before removing the counteracting force, allowing the natural closing bias to urge the tube openings closed to clamp the tube holding portions onto the tubes and form the interference fit between the tube and the tube holding portions that holds the plunger sections together.

Figure 2:
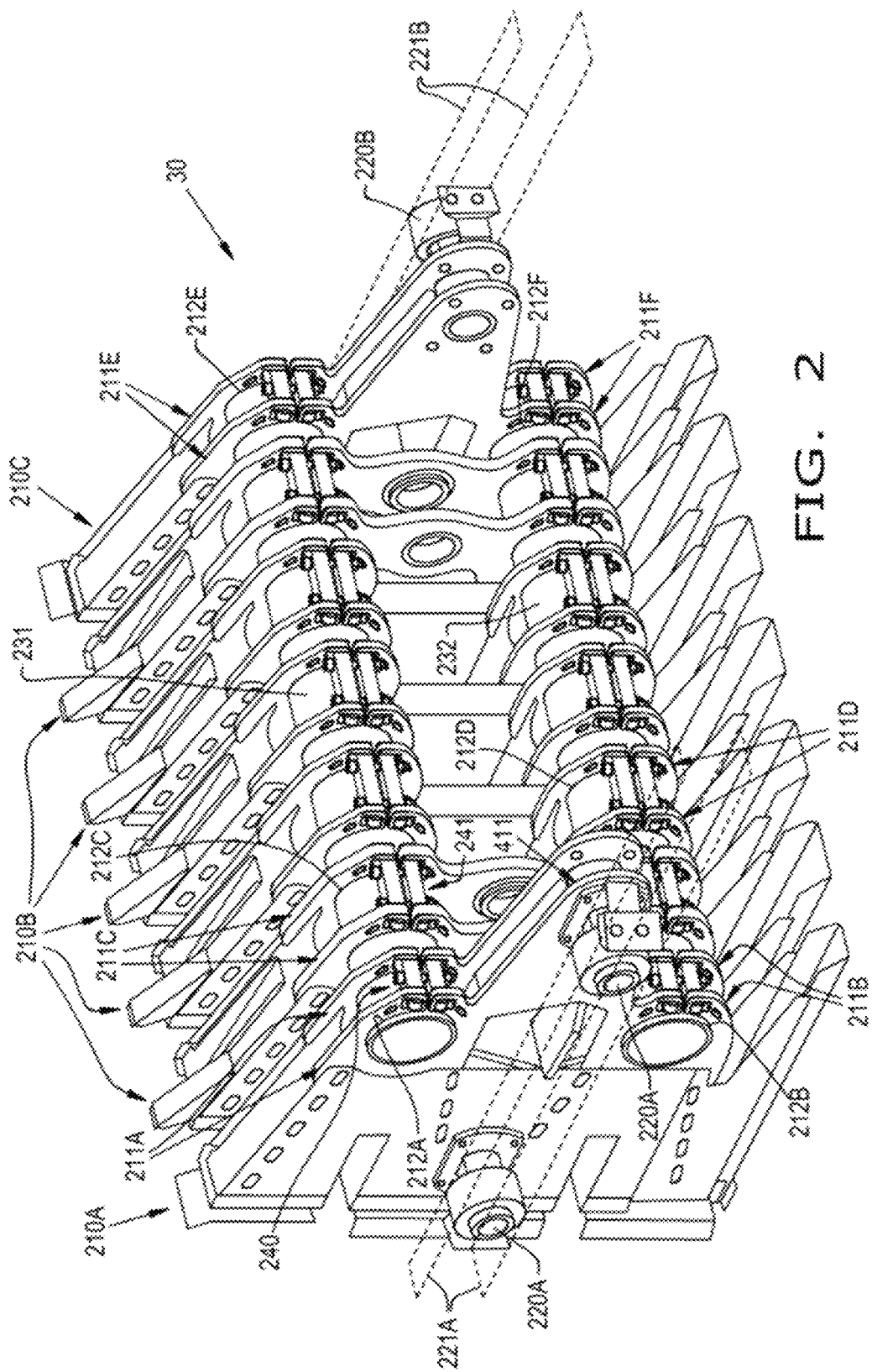
FIG. 2 is a perspective view of an exemplary embodiment of a plunger formed according to the present invention.
Figure 4:
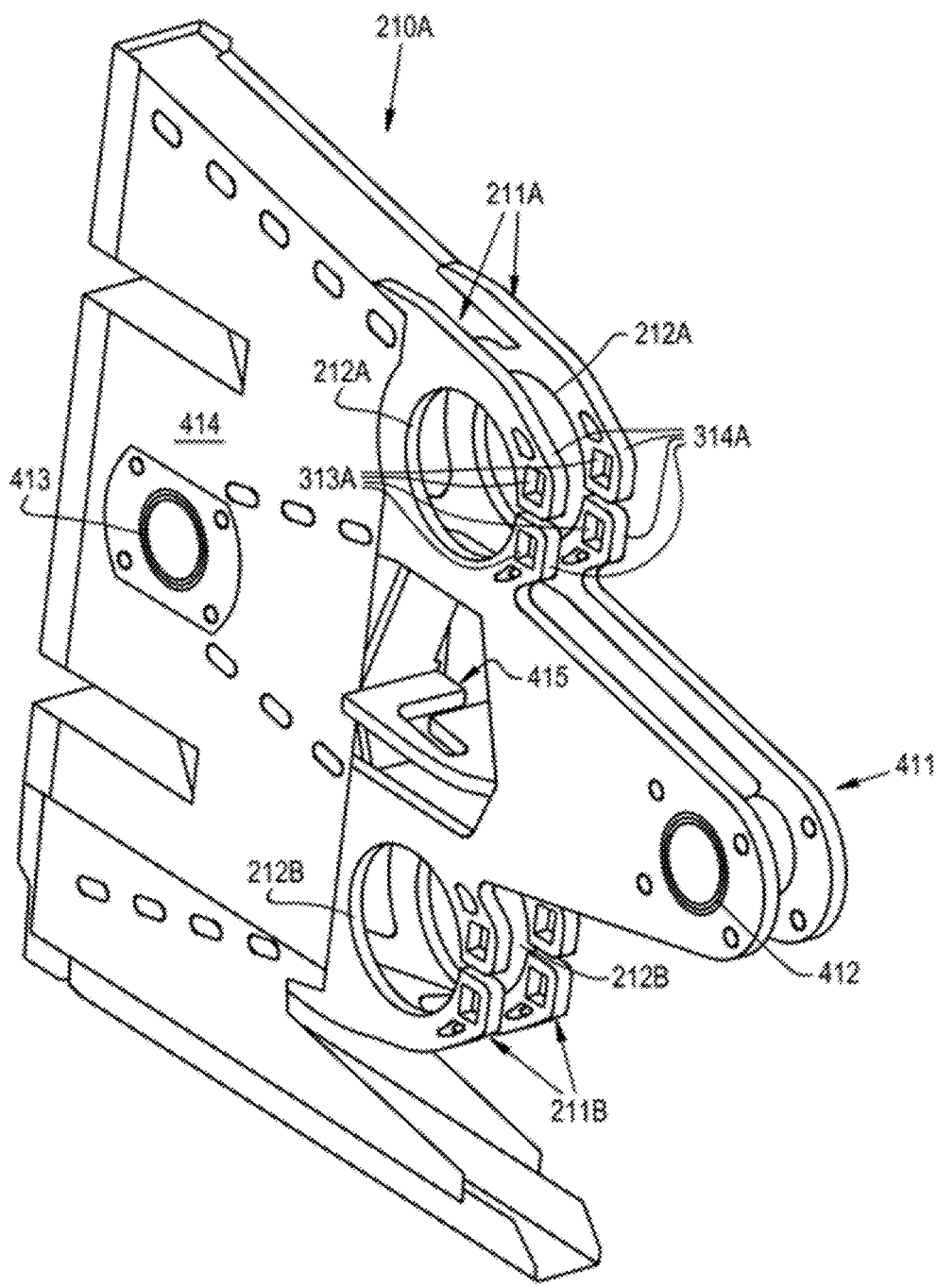
FIG. 4 is a perspective view of an exemplary embodiment of a plunger end section illustrated in FIG. 1.

Referring specifically now to FIG. 4, one of the plunger end sections 210A is illustrated in further detail. The plunger end section 210A may have a roller connecting portion 411 that is connected to the tube holding portions 211A and 211B and extends rearwardly. One of the rollers 220A, such as a rear roller, may connect to the roller connecting portion 411 by, for example, being placed and held within a roller opening 412 formed in the roller connecting portion 411, as illustrated in FIG. 2. Another roller 220A, such as a front roller, may be placed and held within another roller opening 413 formed in a side surface 414 of the plunger end section 210A. The roller connecting portion 411 may be sized and the roller opening 412 formed in the roller connecting portion 411 to provide a desired separation between the front and rear rollers 220A when the rollers 220A are installed in the roller openings 412, 413. A side roller connecting portion 415 may also be provided for connecting a side roller (or a sliding block) to the plunger end section 210 that engages a side of one of the plunger rails 221A. The other plunger end section 210C may be similar to the plunger end section 210A, but formed as a mirror image, so a separate description of the plunger end section 210C is omitted for brevity.

Figure 5:
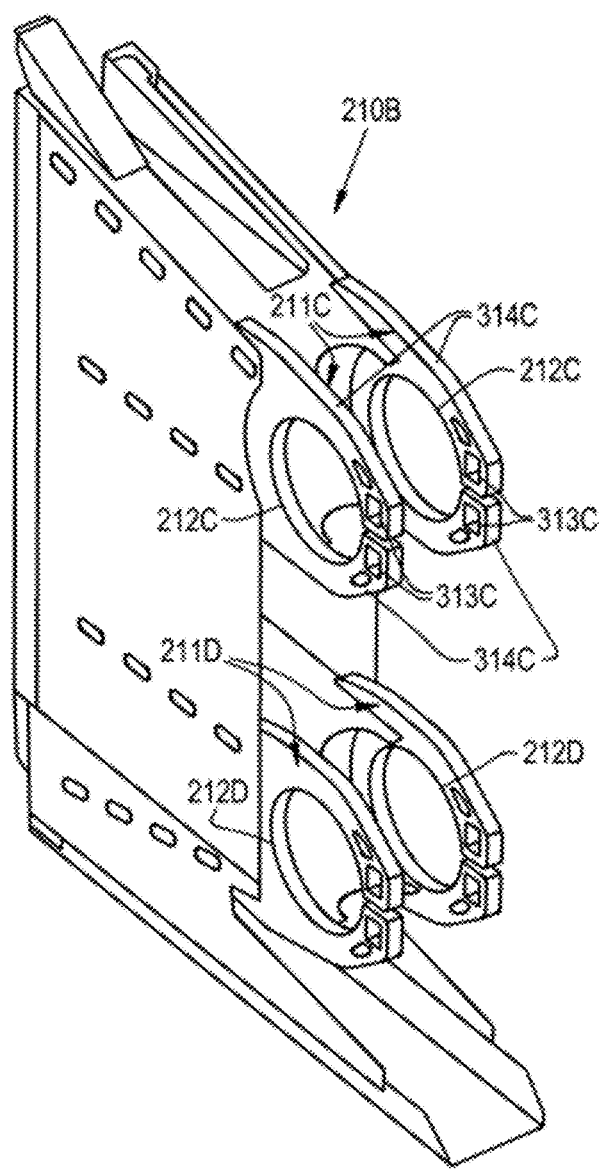
FIG. 5 is a perspective view of an exemplary embodiment of an intermediate plunger section illustrated in FIG. 1.

Referring specifically now to FIG. 5, an exemplary embodiment of one of the intermediate plunger sections 210B is illustrated by itself in greater detail. Some of the intermediate plunger sections 210B may be formed similarly to the intermediate plunger section 210B illustrated in FIG. 5. The major features of the intermediate plunger section 210B have been described previously, so further description is omitted for brevity.

Figure 6:
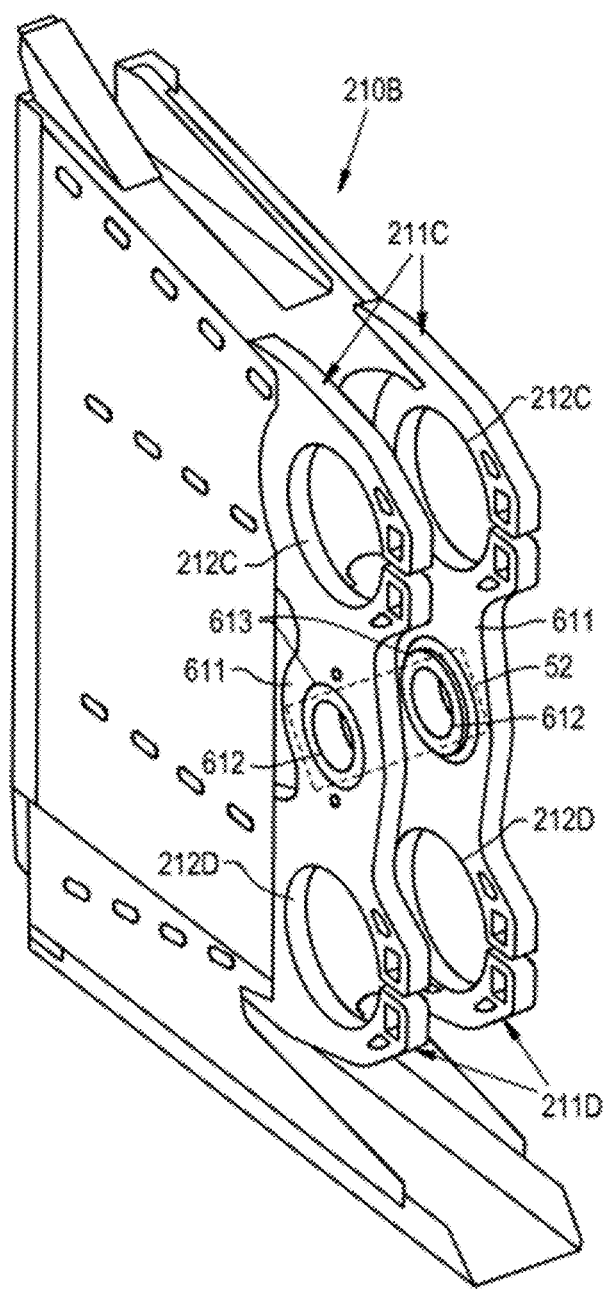
FIG. 6 is a perspective view of an exemplary embodiment of a plunger section illustrated in FIG. 1 that includes a driver connection portion.

Referring specifically now to FIG. 6, one of the intermediate plunger sections 210B is illustrated with a pair of driver connection portions 611 connected to the pair of tube holding portions 211C, 211D of the plunger section 210B. The pair of driver connection portions 611 each include a rod opening 612 that is sized to hold a connecting rod, such as the previously described connecting rod 52. The rod openings 612 of the pair of driver connection portions 611 may be coaxially aligned with one another to hold the connecting rod 52 in both rod openings 612. In this respect, the pair of driver connection portions 611 connect the connecting rod 52 to the plunger section 210B, and thus the other plunger sections 210A, 210B, 210C forming the plunger 30, to reciprocatingly drive the plunger 30 by the crank arm 40. It should be appreciated that the plunger 30 may be formed to have two plunger sections 210B with one or more driver connection portions 611, as illustrated in FIG. 2, to connect the plunger 30 to two crank arms. Further, while the plunger section 210B is described and illustrated as having a pair of driver connection portions 611 each having a respective rod opening 612, in some embodiments the plunger section may have a single driver connection portion 611 with a rod opening 612 to hold the connecting rod 52 (illustrated in dotted lines). In some embodiments, a rod bushing 613 is placed in the rod opening 612 to form a tight fit between the rod opening 612 and the inserted connecting rod 52.

From the foregoing, it should be appreciated that forming the plunger 30 by holding together plunger sections 210A, 210B, 210C around one or more tubes 231, 232 eliminates the need to weld the plunger sections 210A, 210B, 210C to, for example, a separate plunger frame. It has been found that such welding can cause durability issues in plungers due to material weakness that is caused by the heat used to form the welds. Further, there can be tight spaces between the plunger frame and sections where a welding tool, such as a welding torch, cannot reach, leading to incomplete welds that may not span an entire interface between the frame and the sections. The combination of reduced material strength and incomplete welds can lead to durability issues such as, for example, fractures formed in the plunger section adjacent to the welds between the plunger section and frame. The formed fractures tend to propagate through the plunger section and may ultimately make the plunger unsuitable and/or unsafe for further use.

The plunger 30, on the other hand, foregoes the need for welding the plunger sections 210A, 210B, 210C to a separate frame to form the plunger 30. Instead, the plunger sections 210A, 210B, 210C each have one or more tube holding portions 211A, 211B, 211C, 211D, 211E, 211F that form an interference fit with one or more tubes 231, 232 to hold the plunger sections 210A, 210B, 210C together. The size of the interference fit interface may be adjusted by, for example, providing relatively large tubes to produce significant friction between the tube holding portions 211A, 211B, 211C, 211D, 211E, 211F and the tubes 231, 232, providing a secure fit. In some embodiments, the tube holding portions 211A, 211B, 211C, 211D, 211E, 211F are clamped to the tube(s) 231, 232, and the amount of clamping force can be varied to produce a desired friction between the tube holding portions 211A, 211B, 211C, 211D, 211E, 211F and the tube(s) 231, 232 that prevents the plunger sections 210A, 210B, 210C from separating from the tube(s) 231, 232. If one of the plunger sections 210A, 210B, 210C does begin to loosen, due to material wear or otherwise, the clamping force can simply be increased by re-tightening the loose section to the tube(s) 231, 232. Further, if one of the plunger sections 210A, 210B, 210C is damaged during operation, the damaged plunger section can be easily removed from the tube(s) 231, 232 by unclamping the damaged plunger section and removing it from the tube 231, 232. Thus, the plunger 30 formed according to the present invention can be sufficiently strong and more durable than plungers formed by welding plunger sections to a frame, while also providing a way to easily repair and/or replace loose or damaged plunger sections.

Figure 7:
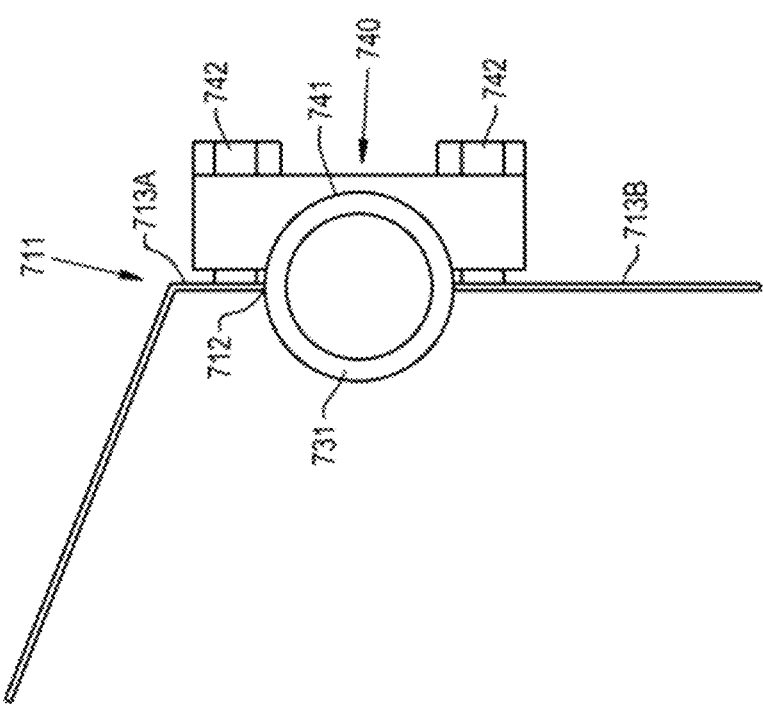
FIG. 7 is a cross-sectional view of an exemplary embodiment of a tube holding portion and a clamp that are clamped onto a cylindrical tube.

Referring now to FIG. 7, another exemplary embodiment of a tube holding portion 711 forming an interference fit with a tube 731 that may be provided on a plunger section in accordance with the present invention is illustrated. As can be seen, the tube holding portion 711 has a tube opening 712 formed therein that holds the tube 731. The tube opening 712 is formed in a pair of planar surfaces 713A, 713B, with each of the planar surfaces 713A, 713B being on an opposite side of the tube 731. A clamp 740 with a round notch 741 is connected to the planar surfaces 713A, 713B by connectors 742 to form an interference fit between the tube 731 and the tube holding portion 711, holding the tube holding portion 711 to the tube 731. The round notch 741 can have a complementary shape to the tube 731 so the clamp 740 directly bears on the tube 731 to press the tube 731 into a similarly round notch in the tube holding portion 711 and form the interference fit. In some embodiments, another clamp is placed on a side of the tube 731 opposite the clamp 740 and connected to the planar surfaces 713A, 713B so the tube 731 is clamped between the clamps to the tube holding portion 711.

Figure 8:
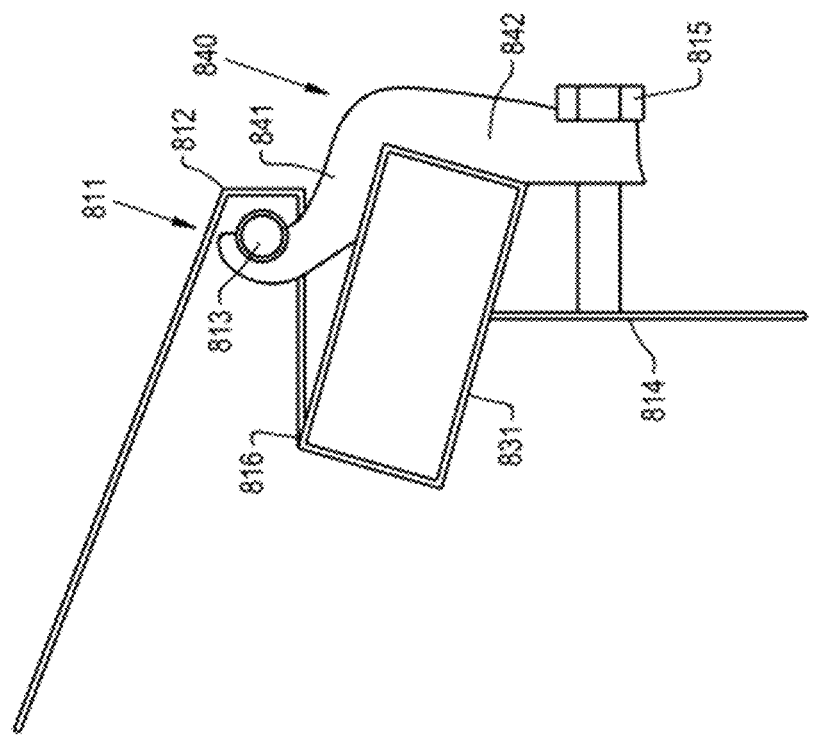
FIG. 8 is a cross-sectional view of another exemplary embodiment of a tube holding portion and a clamp that may be used to clamp the tube holding portion onto a non-circular tube.

Referring now to FIG. 8, another exemplary embodiment of a tube holding portion 811 forming an interference fit with a tube 831 that may be provided on a plunger section in accordance with the present invention is illustrated. Unlike previously described and illustrated tubes, which are cylindrical, the tube 831 has a rectangular cross-section. To form the interference fit between the tube 831 and the tube holding portion 811, a clamp 840 may be provided that bears on the tube 831 and presses the tube 831 into a tube opening 816 of the tube holding portion 811. The clamp 840 may include, for example, a first portion 841 that pivotably connects to a corresponding portion 812 of the tube holding portion 811 via a pivot pin 813 and a second portion 842 connected to the first portion 841 and to a corresponding portion 814 of the tube holding portion 811 via a bolt 815. The clamp 840, therefore, may pivot about the pivot pin 813 to insert the tube 831 into a tube opening 816 of the tube holding portion 811 before connecting the second portion 842 of the clamp 840 to the portion 814 with the bolt 815 to securely hold the tube holding portion 811 to the tube 831. It should thus be appreciated that the tubes and clamps provided in accordance with the present disclosure may have many different types of cross-sectional shapes and configurations.

Figure 9:
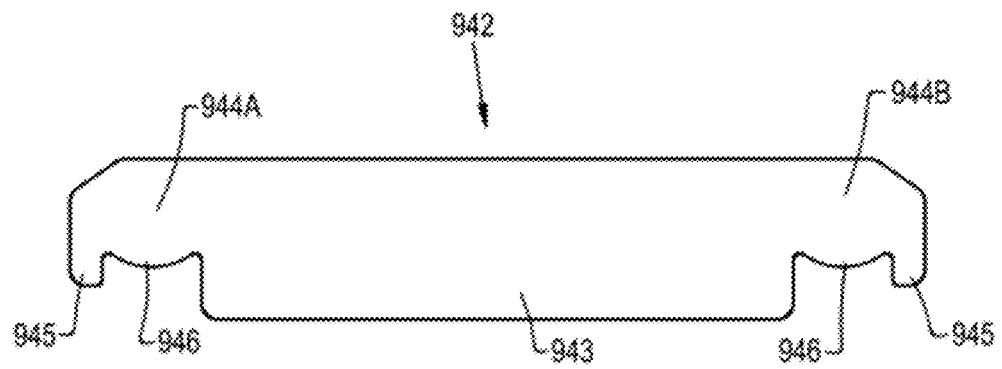
FIG. 9 is a front view of another exemplary embodiment of a clamp bar of a clamp that may be used to clamp a tube holding portion of the plunger illustrated in FIG. 2 onto a tube.
Figure 10:
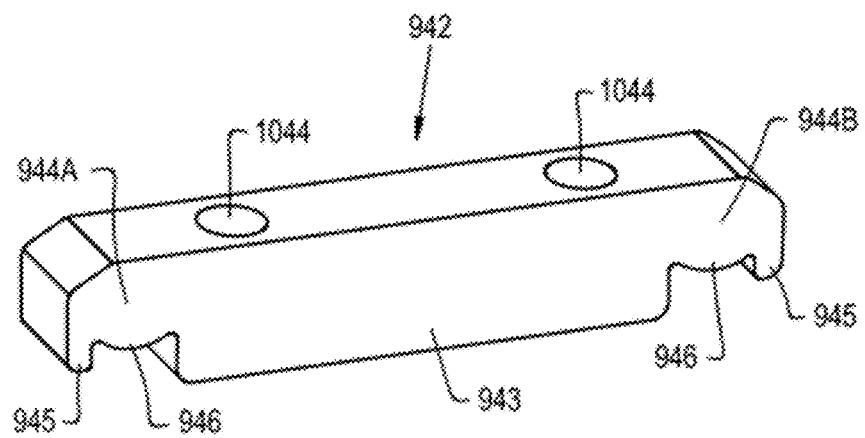
FIG. 10 is a perspective view of the clamp bar illustrated in FIG. 9.

Referring now to FIGS. 9-10, another exemplary embodiment of a clamp bar 942 that may be used in a clamp to form an interference fit between a tube and a tube holding portion of a plunger section is illustrated. The clamp bar 942 includes a base 943 with one or more connector openings 1044 formed therein to hold, for example, bolts (not illustrated in FIGS. 9-10). The bolts may hold two clamp bars 942 together, similar to the previously described clamps 240, 241. The clamp bar 942 may further include a pair of bearing portions 944A, 944B on opposite sides of the base 943 that each have a lip 945 connected thereto, similarly to the previously described clamp bars 242A, 242B, 243A, 243B. The bearing portions 944A, 944B can be held in respective clamp openings of a tube holding portion, with the lips 945 securing the clamp bar 942 in the clamp opening. The clamp bar 942 may further include a rounded notch 946 formed in each of the bearing portions 944A, 944B that will bear on the tube holding portion. The rounded notches 946 may, for example, allow slight rotation of the clamp bars 942 in the clamp openings during operation. When the clamp bar 942 is formed with rounded notches 946 in the bearing portions 944A, 944B, the clamp opening in which the clamp bar 942 is placed may include a rounded recess in which the rounded notches 946 are placed to allow the rotation. In other respects, the clamp bar 942 may be similar to the previously described clamp bars 242A, 242B, 243A, 243B.

Figure 11:
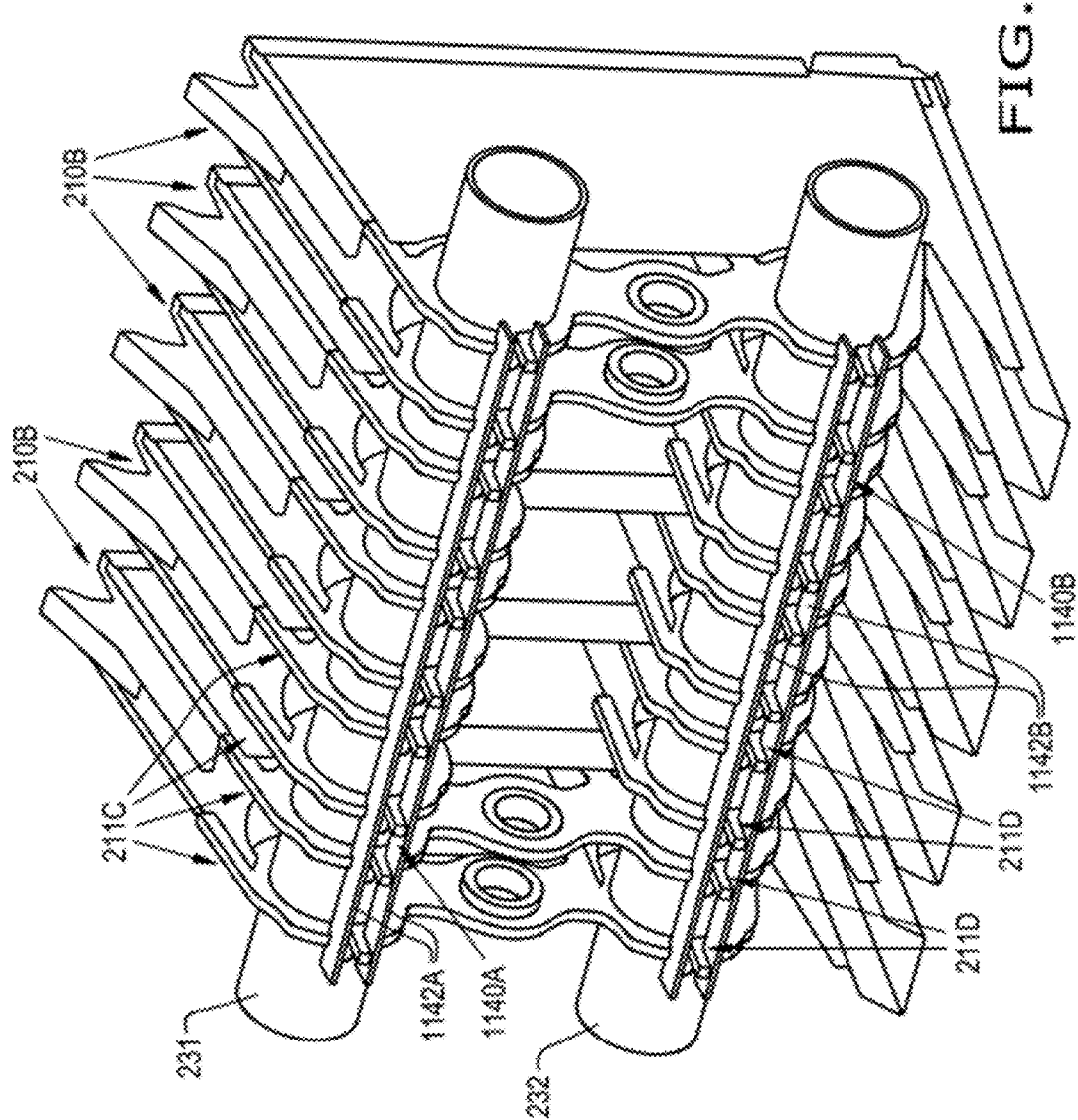
FIG. 11 is a perspective view of another exemplary embodiment of a plunger formed according to the present invention that includes clamps that clamp multiple tube holding portions onto a tube.

Referring now to FIG. 11, intermediate plunger sections 210B of the plunger 30 are illustrated with respective tube holding portions 211C, 211D that are clamped to the tubes 231, 232 using clamps 1140A, 1140B that clamp multiple tube holding portions 211C, 211D to the tubes 231, 232. As illustrated, the clamp 1140A is used to clamp the tube holding portions 211C to the tube 231 and the clamp 1140B is used to clamp the tube holding portions 211D to the tube 232. In this respect, each clamp 1140A, 1140B may include a pair of respective clamp bars 1142A, 1142B that are connected to one another to urge spaced apart clamp openings of the tube holding portions 211C, 211D toward one another to clamp the tube holding portions 211C, 211D onto the tubes 231, 232, similarly to the previously described clamps 240. Other than the clamps 1140A, 1140B being lengthened in order to clamp multiple tube holding portions 211C, 211D onto the tubes 231, 232, the clamps 1140A, 1140B can be similar to the previously described clamps 240.

Figure 12:
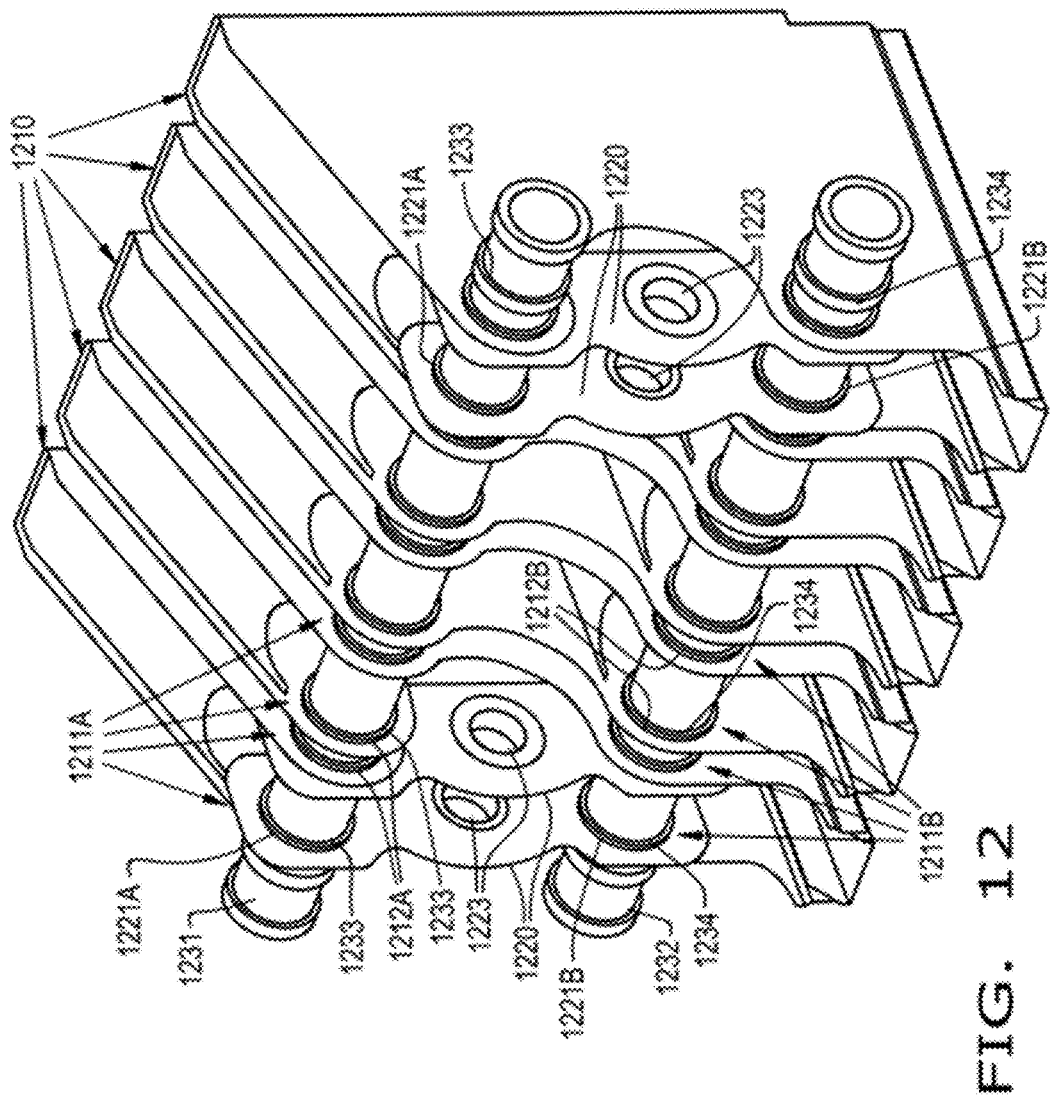
FIG. 12 is a perspective view of another exemplary embodiment of plunger sections formed according to the present invention held together by a tube with increased diameter portions that form an interference fit in tube openings of the plunger sections.
Figure 14:
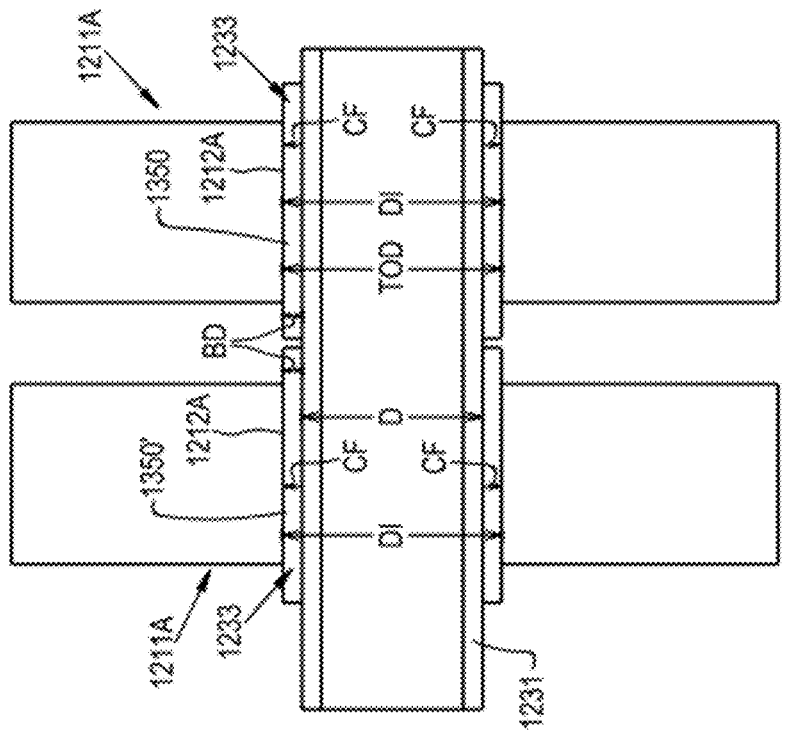
FIG. 14 is another cross-sectional view illustrating bushings disposed between the tube and multiple tube openings illustrated in FIG. 12.
Figure 13:
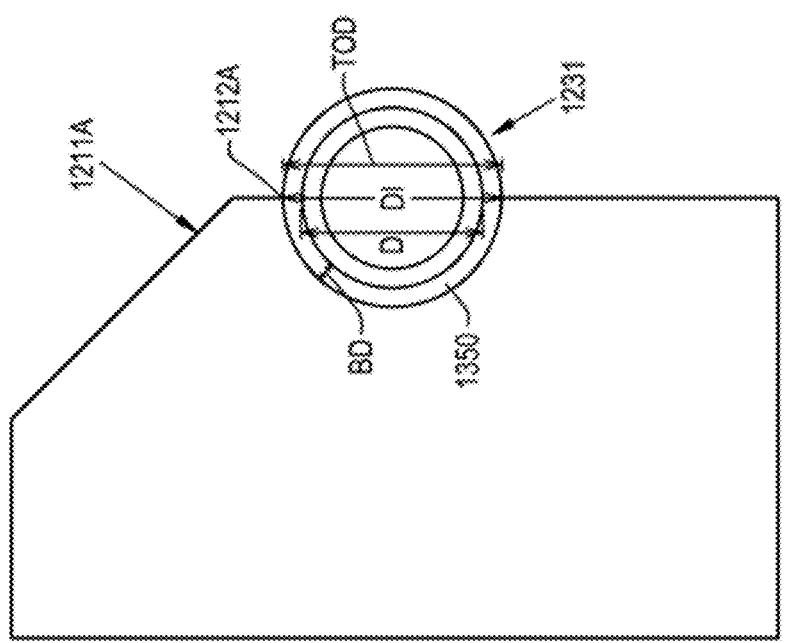
FIG. 13 is a side view illustrating a bushing disposed between the tube and one of the tube openings illustrated in FIG. 12.

Referring now to FIGS. 12-14, another exemplary embodiment of plunger sections 1210 held together around one or more tubes 1231, 1232 to form the plunger 30 is illustrated. It should be appreciated that while plunger end sections having rollers attached thereto are not illustrated in FIGS. 12-14, the plunger end sections can be formed similarly to the plunger sections 1210 that are illustrated. Each of the plunger sections 1210 includes one or more tube holding portion, illustrated as respective pairs of tube holding portions 1211A, 1211B. Each of the tube holding portions 1211A, 1211B has a respective tube opening 1212A, 1212B that holds a portion of one of the tubes 1231, 1232. The tube openings 1212A of the tube holding portions 1211A can be coaxially aligned with one another and the tube openings 1212B can be coaxially aligned with one another.

As can be seen, each of the tubes 1231, 1232 may include a plurality of increased diameter portions 1233, 1234 where the tubes 1231, 1232 define an increased diameter DI (illustrated in FIGS. 13-14) compared to a normal diameter D (illustrated in FIGS. 13-14) of the tubes 1231, 1232. The increased diameter portions 1233, 1234 may be formed on the tubes 1231, 1232 by placing diameter increasing elements, such as bushings 1350 (illustrated in FIGS. 13-14), on portions of the tubes 1231, 1232, with the increased diameter DI of the increased diameter portions 1233, 1234 being equal to the sum of the normal diameter D of the tubes 1231, 1232 plus a bushing diameter BD of the bushings 1350. Alternatively, the increased diameter portions 1233, 1234 of the tubes 1231, 1232 may be formed, for example, by forming the tubes 1231, 1232 with the increased diameter portions 1233, 1234 during formation of the tubes 1231, 1232, i.e., the increased diameter portions 1233, 1234 are integrally formed with their respective tube 1231, 1232. Each of the tube openings 1212A, 1212B formed in the tube holding portions 1211A, 1212 define a respective tube opening diameter TOD. In some embodiments, all of the tube openings 1212A, 1212B have the same tube opening diameter TOD and the increased diameter portions 1233, 1234 each have the same increased diameter DI.

Referring now to FIGS. 13-14, it can be seen that the increased diameter portions 1233 with bushings 1350 fit within the tube openings 1212A to form the interference fit between the tube 1231 and the tube holding portions 1211A, 1211B to hold the plunger sections 1210 together. To form the interference fit, the increased diameter DI of the increased diameter portions 1233 is greater than the tube opening diameter TOD of the tube openings 1212A when the increased diameter portions 1233 are uncompressed. Thus, when the tube 1231 is inserted through the tube openings 1212A such that the increased diameter portions 1233 are placed in the tube openings 1212A, the increased diameter portions 1233 compress to the same diameter of the tube openings 1212A, i.e., the tube opening diameter TOD. The bushings 1350 may comprise a relatively compressible material to compress within the tube openings 1212A when inserted therein. Compressing the increased diameter portions 1233 from the increased diameter DI to the tube opening diameter TOD creates a counteracting force in material of the increased diameter portions 1233, such as the bushings 1350, that is exerted on the tube openings 1212A, denoted by the arrow CF in FIGS. 13-14. This counteracting force CF produces a significant amount of friction between the tube 1231 and the tube holding portion 1211A, which forms an interference fit between the tube 1231 and the tube holding portion 1211A. The interference fit formed between the tubes 1231, 1232 and the tube holding portions 1211A, 1211B due to these counteracting forces CF, therefore, hold the plunger sections 1210 together. In this respect, oversizing the increased diameter portions 1233, 1234, relative to the tube openings 1212A, 1212B, can be used to form interference fits and hold the plunger sections 1212 together to form the plunger 30, rather than using clamps.

In some embodiments, driver connectors 1220 may also be connected to the tubes 1231, 1232 by undersizing tube mounting openings 1221A, 1221B of the driver connectors 1220 relative to the increased diameter portions 1233, 1234 of the tubes 1231, 1232, i.e., the tube mounting openings 1221A, 1221B define smaller diameters than the increased diameter DI of the increased diameter portions 1233, 1234. The driver connectors 1220 each also have a rod opening 1223 that is sized to hold a connecting rod, such as the previously described connecting rod 52, therein to couple the plunger sections 1210 to the connecting rod 52 for reciprocatingly driving the plunger. While the driver connectors 1220 are illustrated as being separate from the tube holding portions 1211A, 1211B, it should be appreciated that the driver connectors can be integrally formed with and connect the tube holding portions 1211A, 1211B, similarly to the previously described driver connection portions 611.

Referring now to FIG. 15, another embodiment of a plunger 150 for the agricultural machine 10 is described. Like the plunger 30 illustrated in FIG. 2, the plunger 150 in the present embodiment includes the plurality of plunger sections 210A, 210B, 210C, including the pair of plunger end sections 210A, 210C. Also like the plunger 30, the plunger 150 includes the one or more rollers 220A, 220B that may be in contact with, for example, the pair of spaced apart plunger rails 221A, 221B. Furthermore, like the plunger 30 each of the plunger sections 210A, 210B, 210C of the plunger 150 includes at least one tube holding portion having a tube opening 212A, 212B, 212C, 212D, 212E, 212F formed therein and for the first tube 231 and the second tube 232 to be placed within so that an interference fit is formed between the tubes 231, 232 and the tube holding portions, where each of the tube openings 212A, 212B, 212C, 212D, 212E, 212F may be an adjustable size opening that is closed by a respective clamp.

Figure 16:
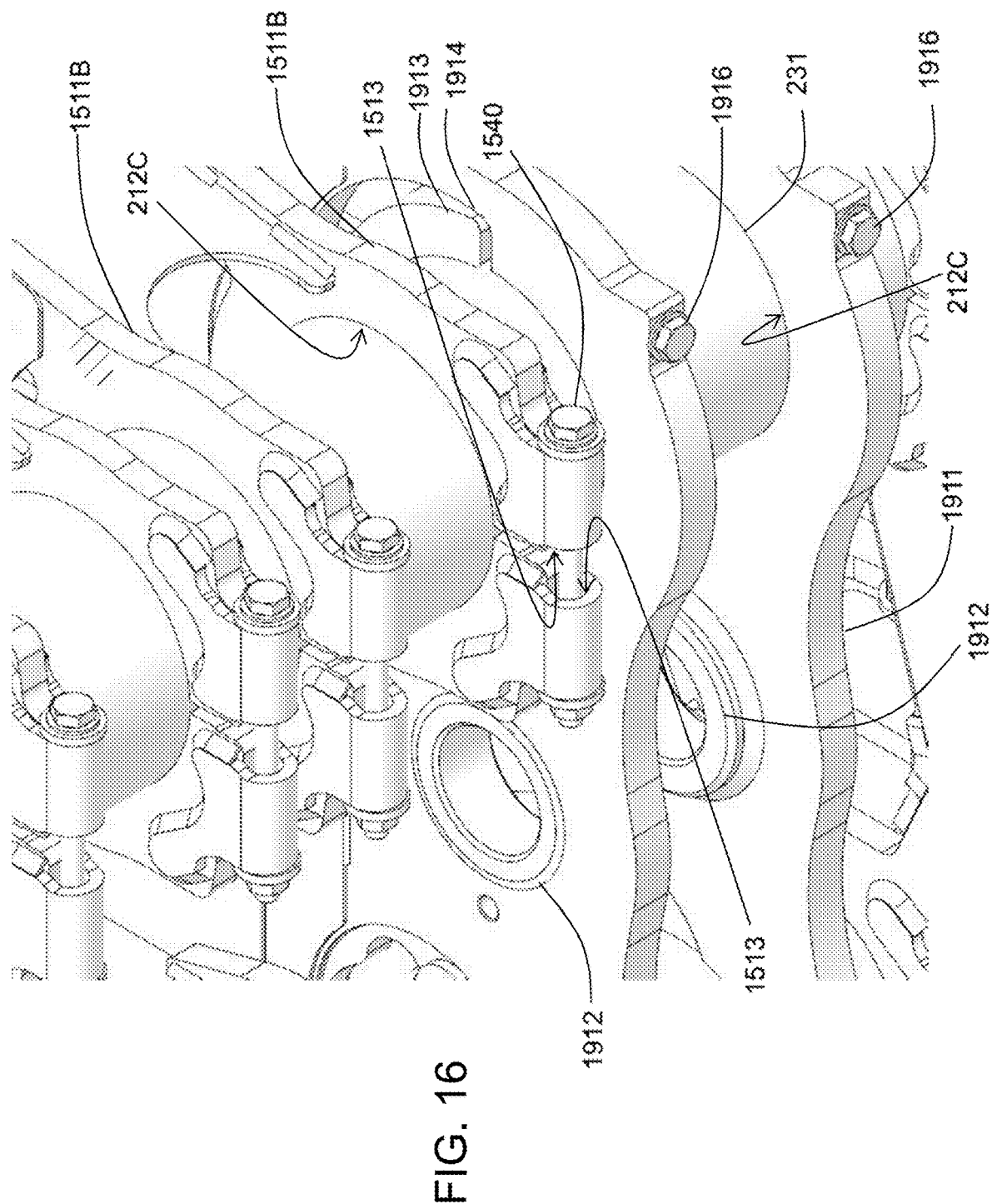
FIG. 16 is a close-up perspective view of tube holding portions of plunger sections illustrated in FIG. 15, and clamps that may be used to clamp the tube holding portions of the plunger onto a tube.

With additional reference to FIGS. 16, 17 and 18, and similarly to the plunger 30 in FIG. 2, the tube holding portions 1511A, 1511B, 1511C, 1511D, 1511E, 1511F of the plunger 150 comprise at least one pair of spaced apart clamp openings 1513 and at least one clamp 1540 urging the at least one pair of spaced apart clamp openings 1513 toward one another to clamp the at least one tube holding portion. Unlike the plunger 30 in FIG. 2, however, in the present embodiment it may be seen that each pair of spaced apart clamp openings 1513 are coaxial. In particular, each pair of spaced apart clamp openings 1513 extend in a vertical direction relative to a direction of operation of the harvester 10 with each clamp opening 1513 being at a front or nose part of the tube holding portions 1511A, 1511B, 1511C, 1511D, 1511E, 1511F. Each pair of spaced apart clamp openings 1513 receives a clamp 1540 that extends through the openings. In the described embodiment, the openings are generally cylindrical and the clamp 1540 is in the form of a bolt that may be tightened to urge the pair of clamp opening portions together. This described embodiment has a particularly favourable structural shape in that it minimizes the number of parts—and therefore the mass—of the arrangement, and in that structural loads through the clamp are efficiently dissipated.

Figure 19:
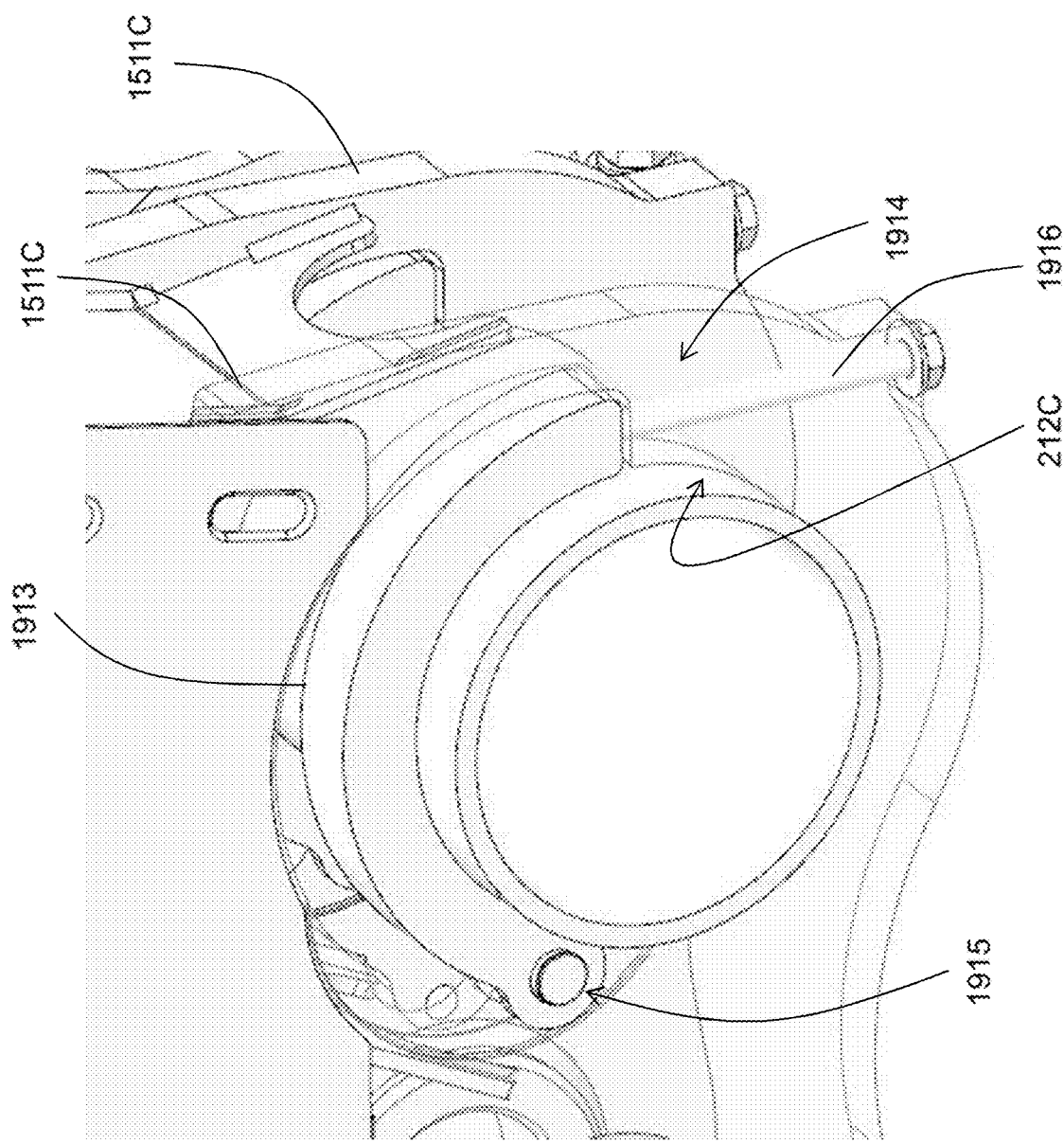
FIG. 19 is a perspective view of part of an exemplary embodiment of a plunger section illustrated in FIG. 15 that includes a driver connection portion, the plunger section having a hinge clamp that may be used to clamp the tube holding portion onto the tube.
Figure 21:
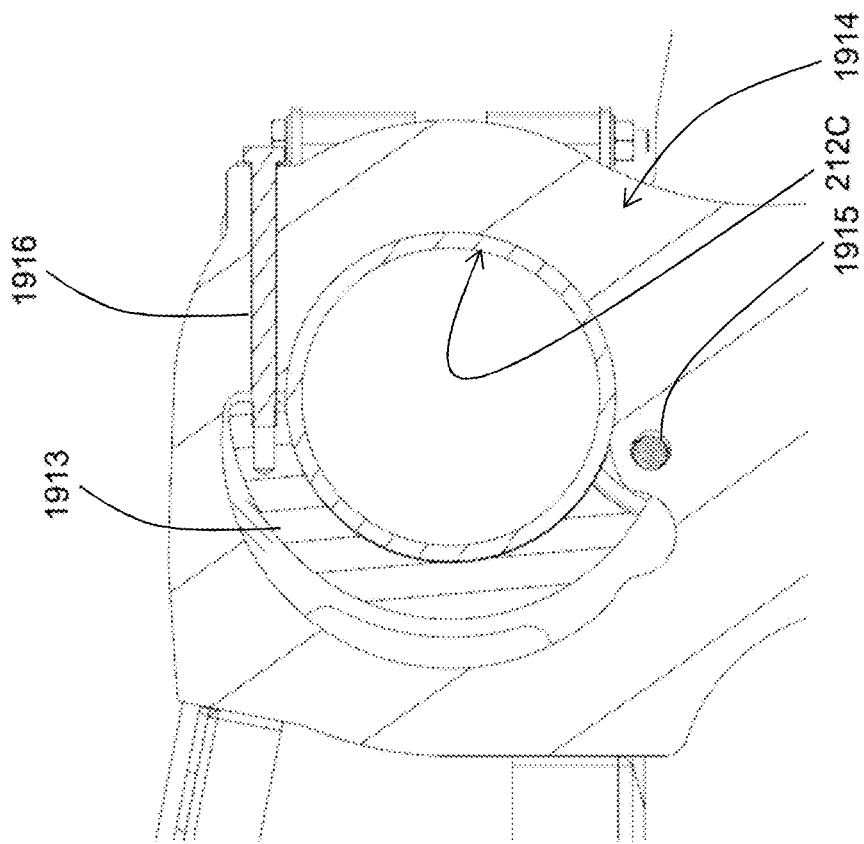
FIG. 21 is a close-up cross-sectional view of the plunger section illustrated in FIG. 20.
Figure 20:
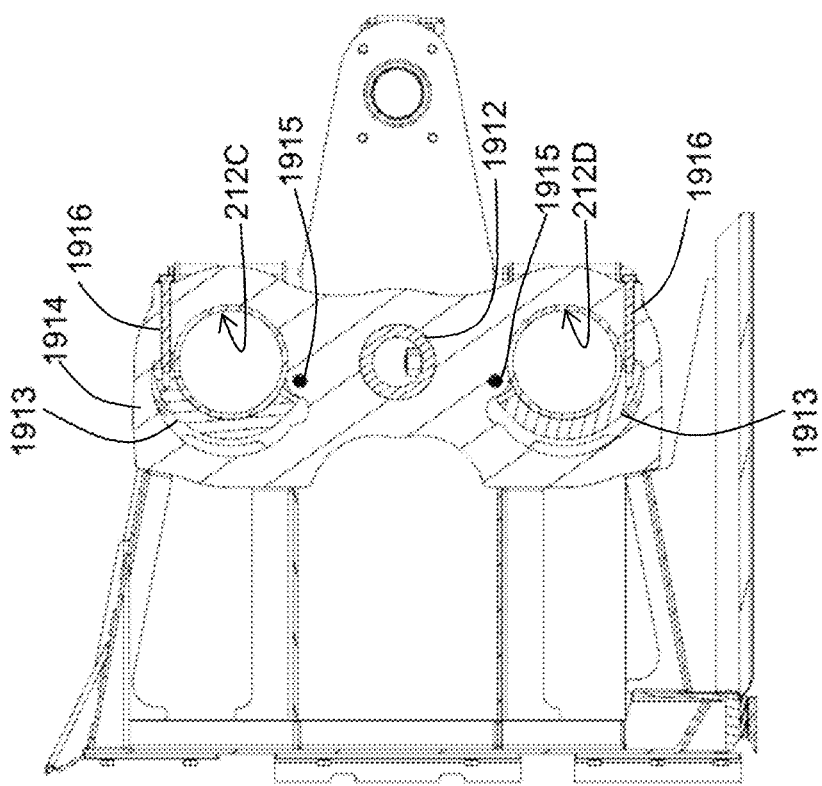
FIG. 20 is a cross-sectional view of the plunger section illustrated in FIG. 19.

Now with additional reference to FIGS. 19, 20 and 21, and similarly to the plunger 30 in FIG. 2, in the present embodiment some of the intermediate plunger sections 210B have a pair of driver connection portions 1911 connected to the pair of tube holding portions 1511C, 1511D of the plunger section 210B. The pair of driver connection portions 1911 each include a rod opening 1912 that is sized to hold a connecting rod. The tube holding portions of these plunger sections have a further clamping mechanism, as is now described. The tube holding portions 1511C, 1511D include an arcuate member 1913 that, together with an inner part of a housing 1914 of the tube holding portions 1511C, 1511D, defines the tube opening 212C, 212D. In particular, the arcuate member 1913 is movable to adjust the size of the tube opening 212C, 212D to thereby respectively clamp or release the at least one tube holding portion 1511C, 1511D onto or from the tube 231, 232. Specifically, the arcuate member 1913 is fixed at a pivot point 1915 thereof, where the arcuate member 1913 is movable by pivoting about the pivot point 1915 to adjust the size of the tube opening 231, 232 and where a radius of an inner side of the arcuate member 1913 is substantially the same as a radius of the tube 231, 232. In the described embodiment, the arcuate member 1913 is movable by a clamp or connector 1916 in the form of a bolt connected to the arcuate member 1913 at an end opposite the pivot point 1915. The connector 1916 extends through, and protrudes from, the tube holding portion 1511C, 1511D, in particular the housing 1914 thereof. Such a clamping mechanism may provide better access to the bolt, and may provide particularly advantageous load dissipation on the plunger sections having driver connection portions.

It is to be understood that although FIGS. 16-21 show a plunger having different types of clamping mechanisms on different plunger sections, in different embodiments a single type of clamping mechanism may be used on each plunger section of the plunger. Equally, one or both of the clamping mechanisms illustrated in the embodiment of FIGS. 16-21 may be combined with the clamping mechanism of FIG. 2 for different sections of a plunger.

In the described embodiments it is noted that an axial direction of the at least one tube 231, 232 is perpendicular to a direction of movement of the plunger 30, 150 relative to the agricultural baler 10 facilitated by the at least one roller 220A, 220B and/or the at least one sliding block. In different embodiments, however, it may be that one or more of the tubes are oriented differently relative to the working direction of movement of the plunger.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A plunger for an agricultural baler, comprising:
   a plurality of plunger sections held together to form the plunger, the plurality of plunger sections comprising a pair of plunger end sections, each of the plunger sections comprising at least one tube holding portion comprising a tube opening formed therein;
   at least one of at least one roller or at least one sliding block attached to and extending laterally from each of the plunger end sections; and
   a tube placed within the tube opening of each tube holding portion such that an interference fit is formed between the tube and the at least one tube holding portion of each plunger section to hold the plunger sections together, wherein the tube opening is an adjustable size tube opening.

2. The plunger of claim 1, wherein at least one of the tube holding portions comprises at least one pair of spaced apart clamp openings, the plunger further comprising at least one clamp urging the at least one pair of spaced apart clamp openings toward one another to clamp the at least one tube holding portion onto the tube.

3. The plunger of claim 2, wherein the at least one clamp comprises a plurality of clamps, each of the plurality of clamps urging the at least one pair of spaced apart clamp openings of a respective tube holding portion toward one another.

4. The plunger of claim 2, wherein a single clamp urges the at least one pair of spaced apart clamp openings of more than one of said tube holding portions toward one another.

5. The plunger of claim 2, wherein the at least one clamp comprises a pair of spaced apart clamp bars urged toward one another by a connector, a portion of each clamp bar being held in a respective one of the clamp openings.

6. The plunger of claim 5, wherein the clamp bars each comprise at least one bearing portion held in a respective clamp opening, each of the bearing portions comprising a rounded notch.

7. The plunger of claim 2, wherein the at least one pair of spaced apart clamp openings are coaxial.

8. The plunger of claim 7, wherein the at least one clamp extends through the at least one pair of spaced apart clamp openings.

9. The plunger of claim 1, wherein at least one of the tube holding portions comprises an arcuate member that is movable to adjust the size of the tube opening to thereby respectively clamp or release the at least one tube holding portion onto or from the tube.

10. The plunger of claim 9, wherein the arcuate member is fixed at a pivot point thereof, the arcuate member being movable by pivoting about the pivot point to adjust the size of the tube opening.

11. The plunger of claim 10, wherein a radius of the arcuate member is the same as a radius of the tube.

12. The plunger of claim 9, wherein the arcuate member is movable by a connector connected to the arcuate member, the connector extending through, and protruding from, the tube holding portion.

13. The plunger of claim 1, further comprising a bushing bearing on the tube and the tube opening.

14. The plunger of claim 1, wherein each plunger section comprises at least one pair of spaced apart tube holding portions, the tube openings of each respective pair of tube holding portions being coaxially aligned with one another.

15. The plunger of claim 1, wherein each plunger section comprises a first tube holding portion comprising the tube opening and a second tube holding portion comprising a second tube opening, the plunger further comprising a second tube placed within the second tube opening of each second tube holding portion such that an interference fit is formed between the second tube and the second tube holding portion of each plunger section.

16. The plunger of claim 1, wherein at least one of the plunger sections comprises a driver connection portion connected to the tube holding portion, the driver connection portion comprising a rod opening sized to hold a connecting rod therein.

17. The plunger of claim 1, further comprising a roller connecting portion connected to the tube holding portion of each of the plunger end sections, the at least one roller connected to the roller connecting portion.

18. A plunger for an agricultural baler, comprising:
a plurality of plunger sections held together to form the plunger, the plurality of plunger sections comprising a pair of plunger end sections, each of the plunger sections comprising at least one tube holding portion comprising a tube opening formed therein;
at least one of at least one roller or at least one sliding block attached to and extending laterally from each of the plunger end sections; and
a tube placed within the tube opening of each tube holding portion such that an interference fit is formed between the tube and the at least one tube holding portion of each plunger section to hold the plunger sections together,
wherein each of the tube openings defines a tube opening diameter and the tube comprises a plurality of increased diameter portions that are each placed in and compressed by a respective tube opening, each increased diameter portion defining an increased diameter that is greater than the tube opening diameter of the respective tube opening in which the increased diameter portion is placed when the increased diameter portion is uncompressed.

19. An agricultural baler, comprising:
a main bale chamber comprising a pair of spaced apart plunger rails; and
a plunger disposed within the main bale chamber, the plunger comprising:
a plurality of plunger sections held together to form the plunger, the plurality of plunger sections comprising a pair of plunger end sections, each of the plunger sections comprising at least one tube holding portion comprising a tube opening formed therein;
at least one roller attached to and extending laterally from each of the plunger end sections and contacting a respective one of the plunger rails; and
a tube placed within the tube opening of each tube holding portion such that an interference fit is formed between the tube and the at least one tube holding portion of each plunger section to hold the plunger sections together, wherein the tube opening is an adjustable size tube opening.

* * * * *